(12) United States Patent
Wood

(10) Patent No.: US 7,584,834 B2
(45) Date of Patent: Sep. 8, 2009

(54) PORTABLE ARTICULATING CONVEYOR DEVICE AND METHOD OF OPERATING A PORTABLE ARTICULATING CONVEYOR

(76) Inventor: Gladys L. Wood, 8315 N. Brooklane, #1205, Bethesda, MD (US) 20814

( * ) Notice: Subject to any disclaimer, the term of this patent is extended or adjusted under 35 U.S.C. 154(b) by 2 days.

(21) Appl. No.: 12/004,878

(22) Filed: Dec. 24, 2007

(65) Prior Publication Data

US 2009/0159396 A1    Jun. 25, 2009

(51) Int. Cl.
  *B65G 21/14* (2006.01)
(52) U.S. Cl. .................. 198/313; 198/312; 198/581
(58) Field of Classification Search ............ 198/312, 198/313, 314, 315, 581, 586, 589, 861.1
  See application file for complete search history.

(56) References Cited

U.S. PATENT DOCUMENTS 3,051,295 A * 8/1962 Moy ..................... 198/313
3,575,310 A * 4/1971 Albertson ............... 198/312
3,850,283 A * 11/1974 Nordstrom ............... 198/313
4,129,229 A * 12/1978 Brown .................. 198/435
5,090,550 A * 2/1992 Axmann ................. 198/313
6,390,278 B1 * 5/2002 Brown .................. 198/589

\* cited by examiner

*Primary Examiner*—James R Bidwell

(57) ABSTRACT

A portable conveyor device, and method of operating and storing the portable conveyor device, the device including a base releasably affixed to a support surface and moveable with respect to the support surface, a first conveyor rotatably attached at a first end to the base by an articulating member, and a second conveyor moveably attached to the base by a vertical conveyor elevation device, wherein the first conveyor being configured to move by the articulating member between a first horizontal position supported on the support surface and a second inclined position and being configured to transport items onto the second conveyor, wherein the second conveyor in a first operating position being configured to receive items from the first conveyor and convey items in both a horizontal direction and a vertical direction.

18 Claims, 15 Drawing Sheets

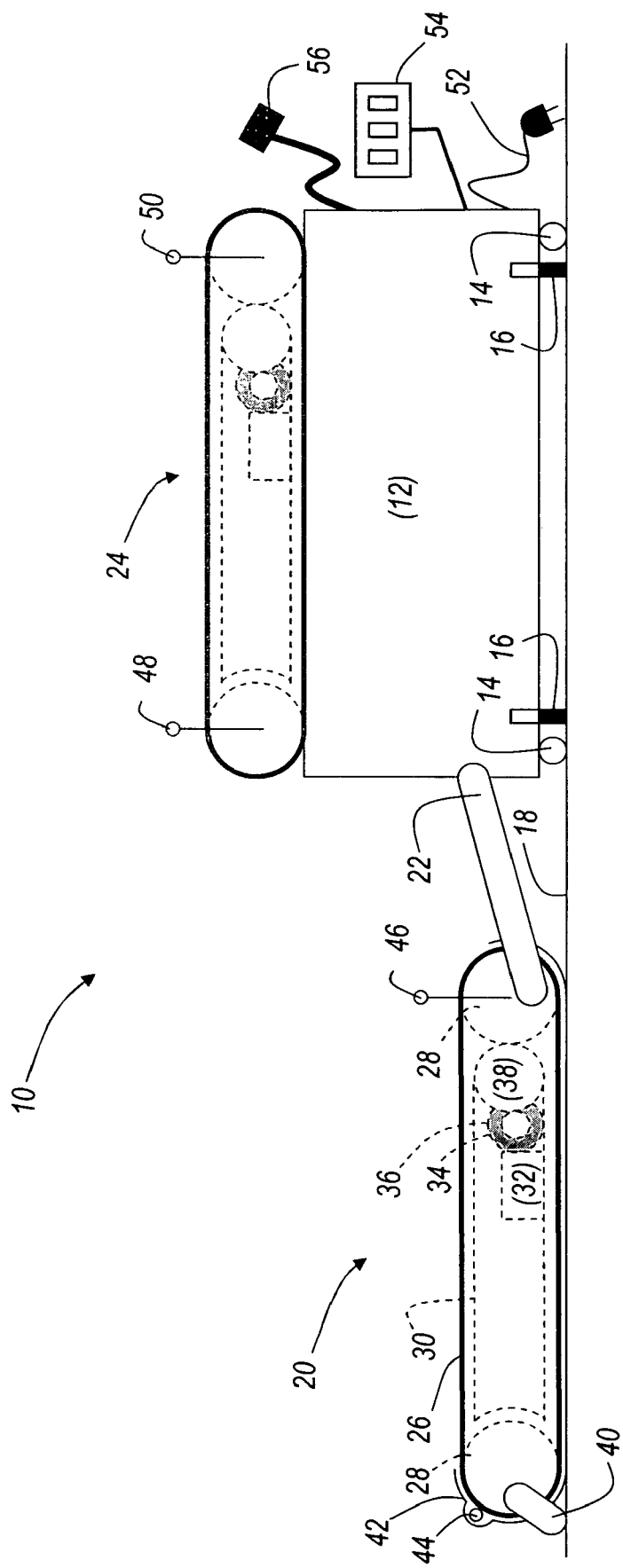

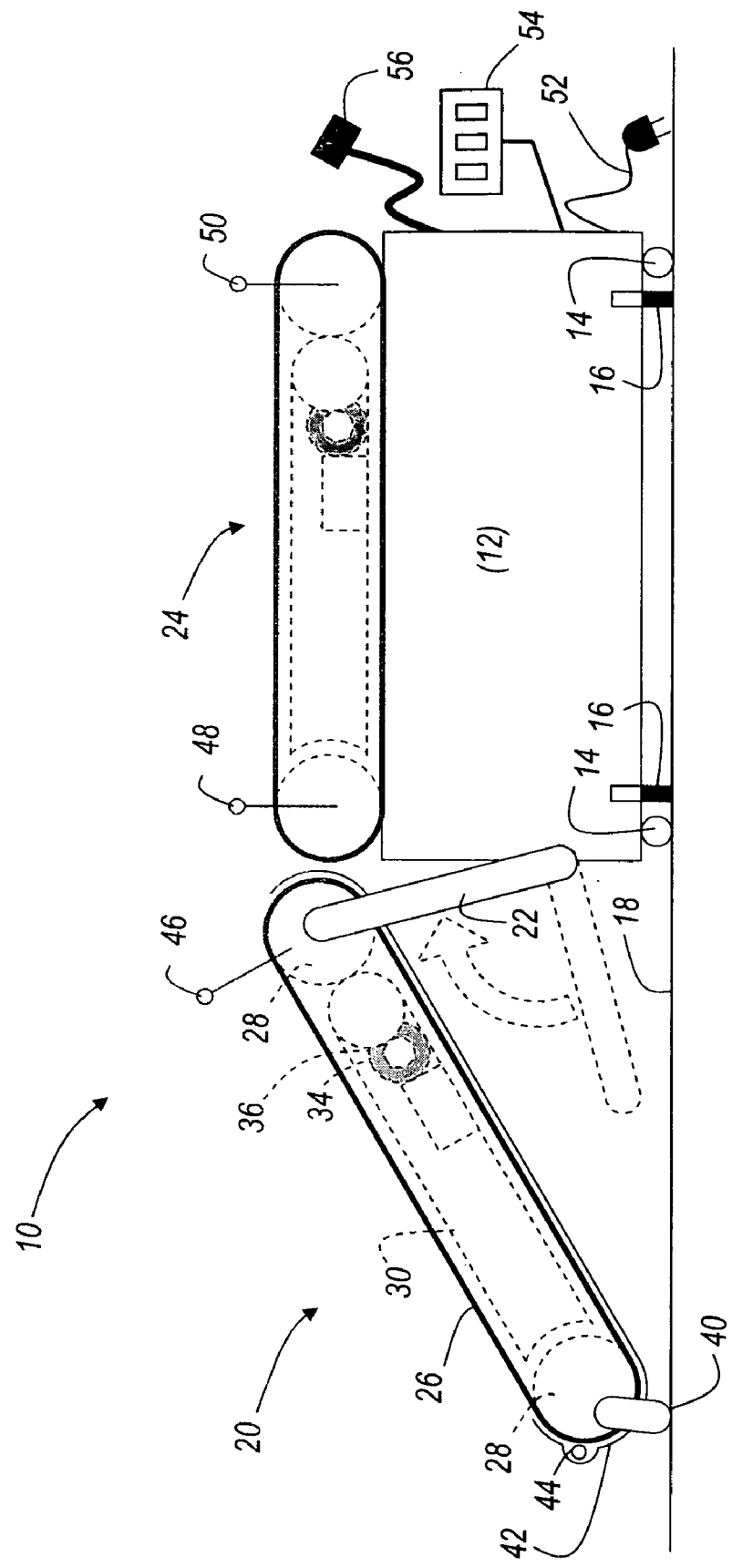

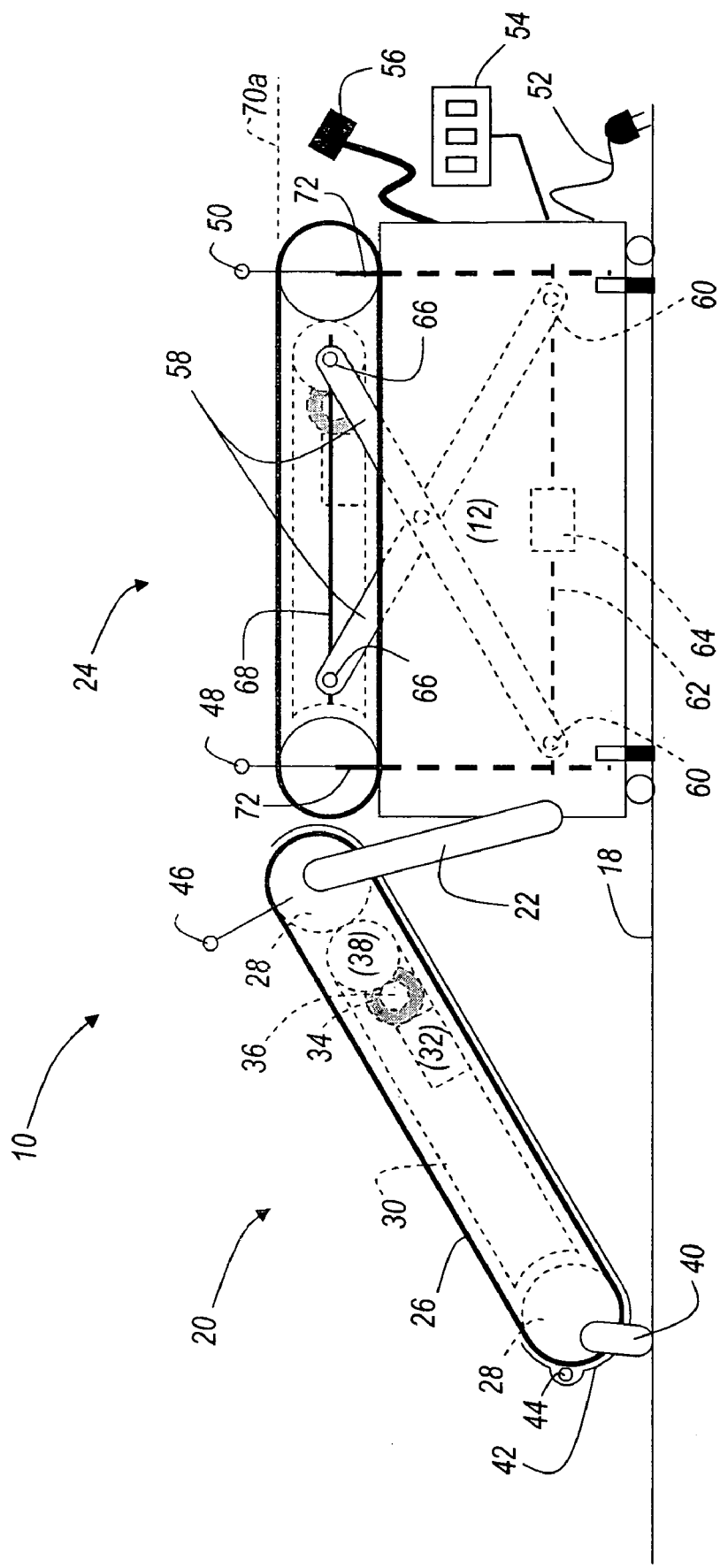

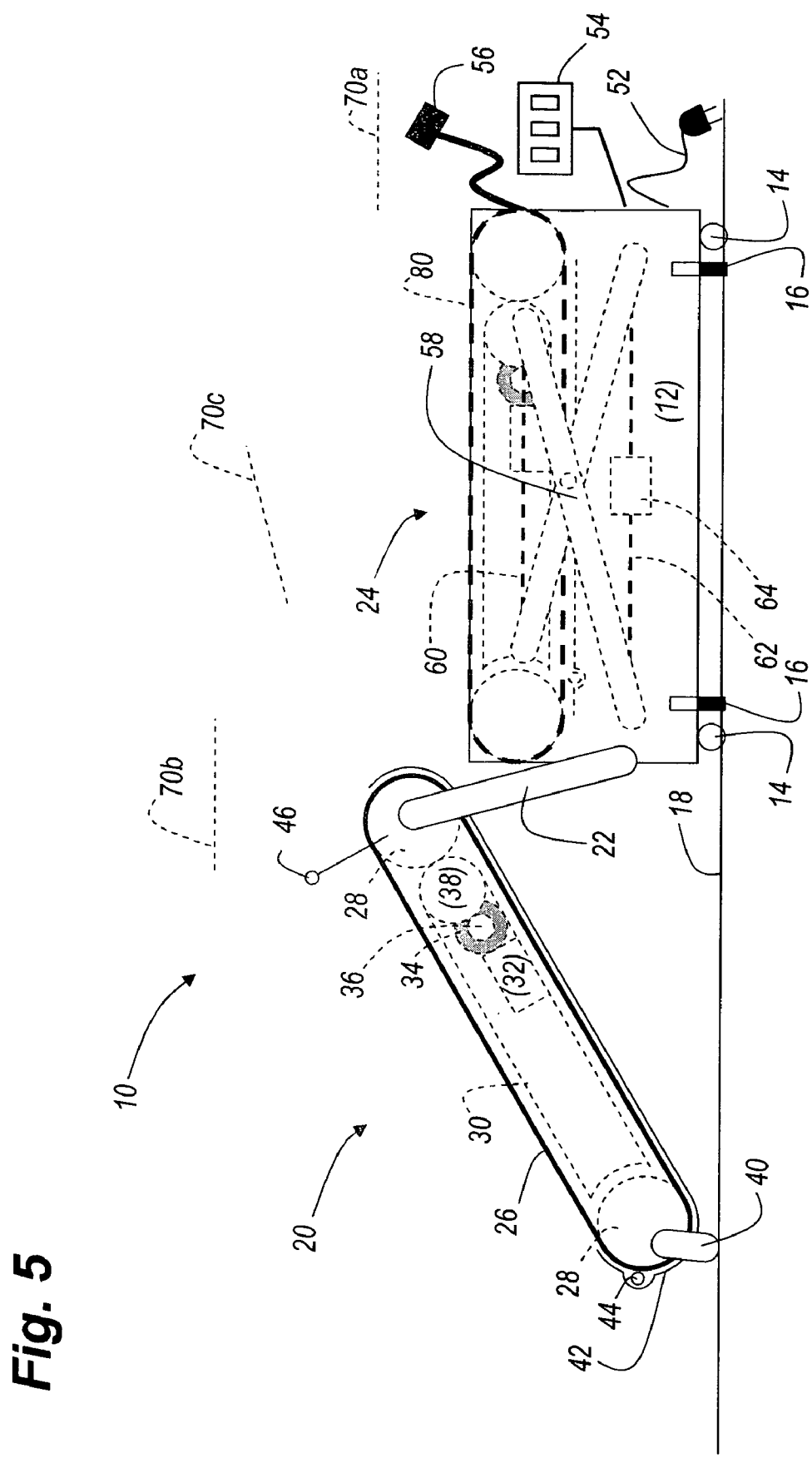

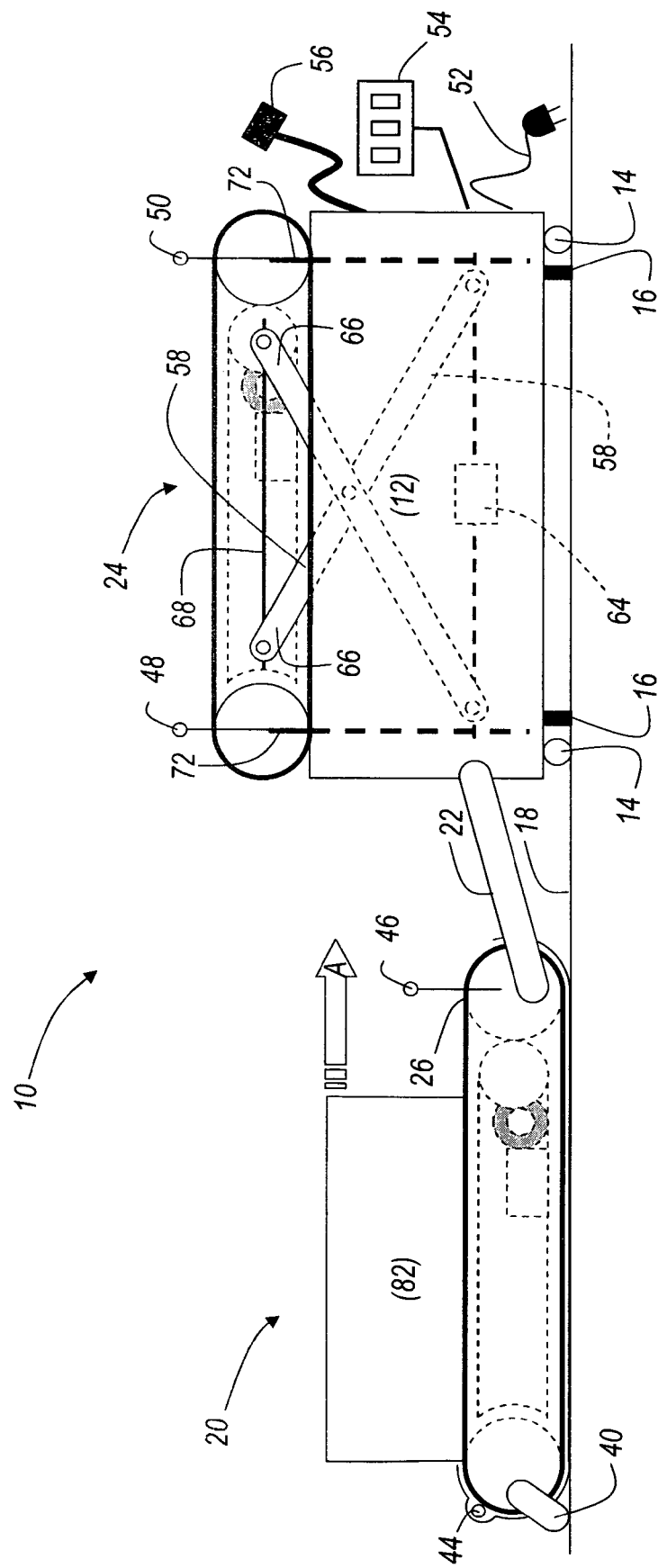

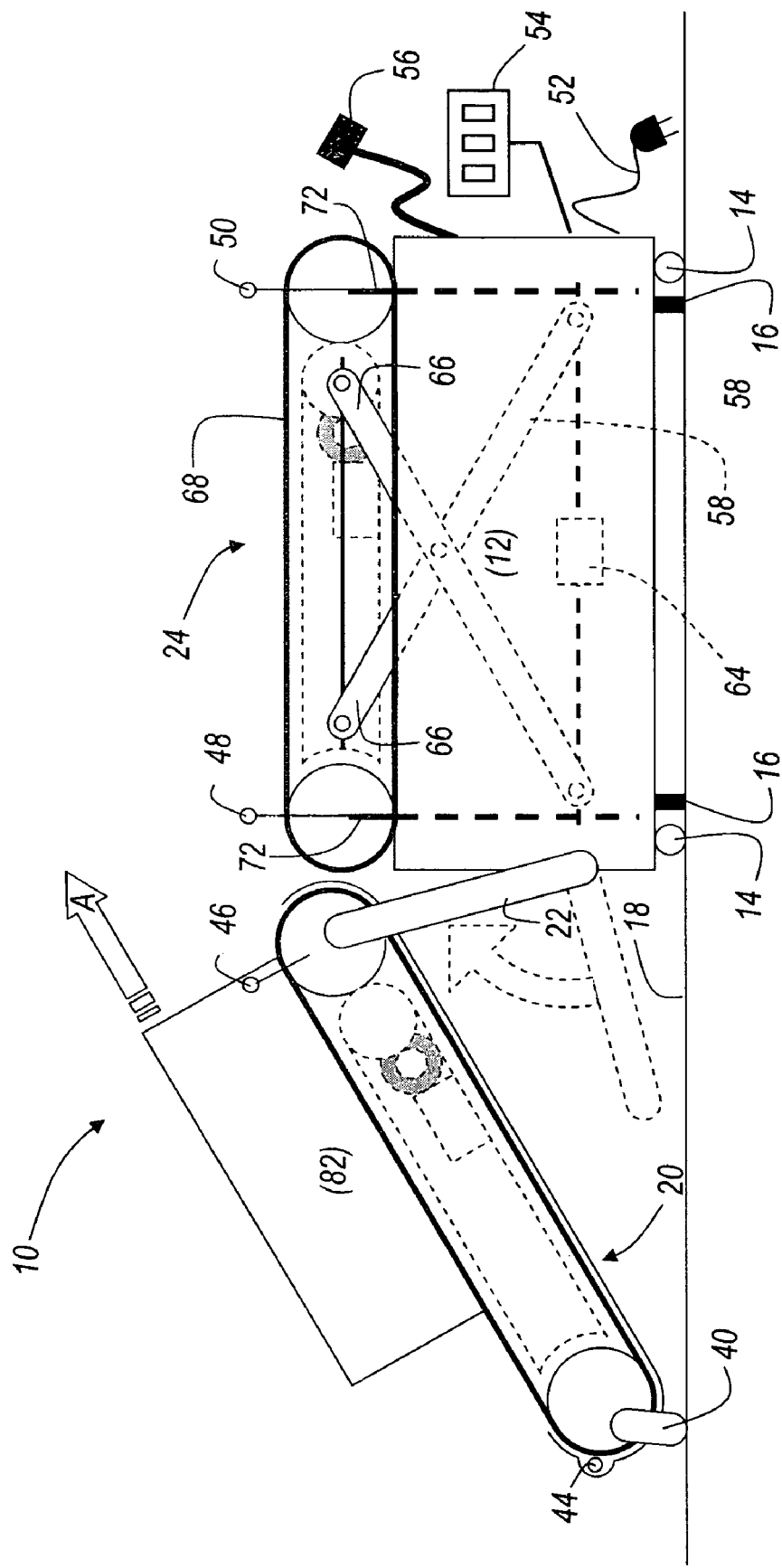

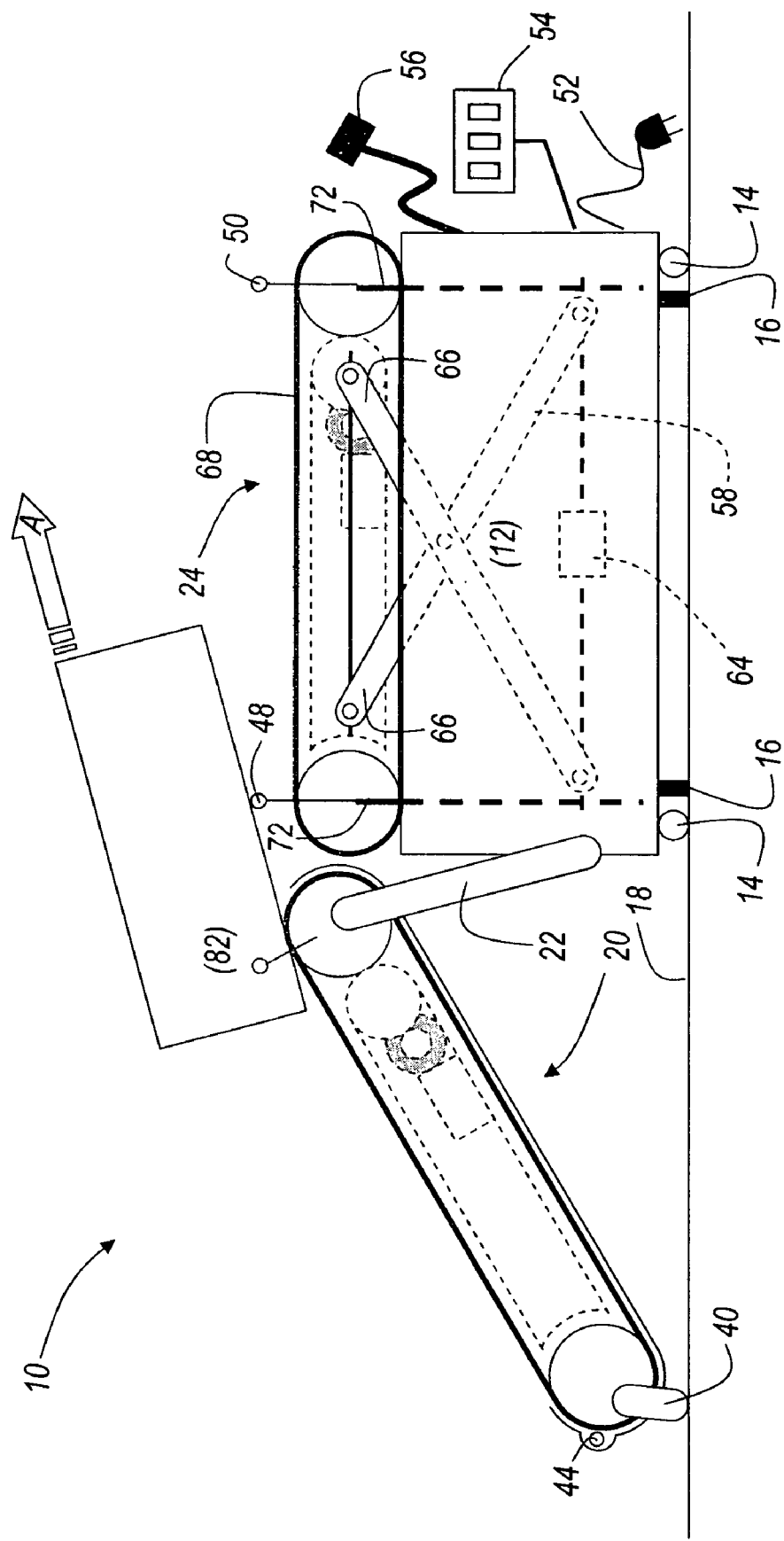

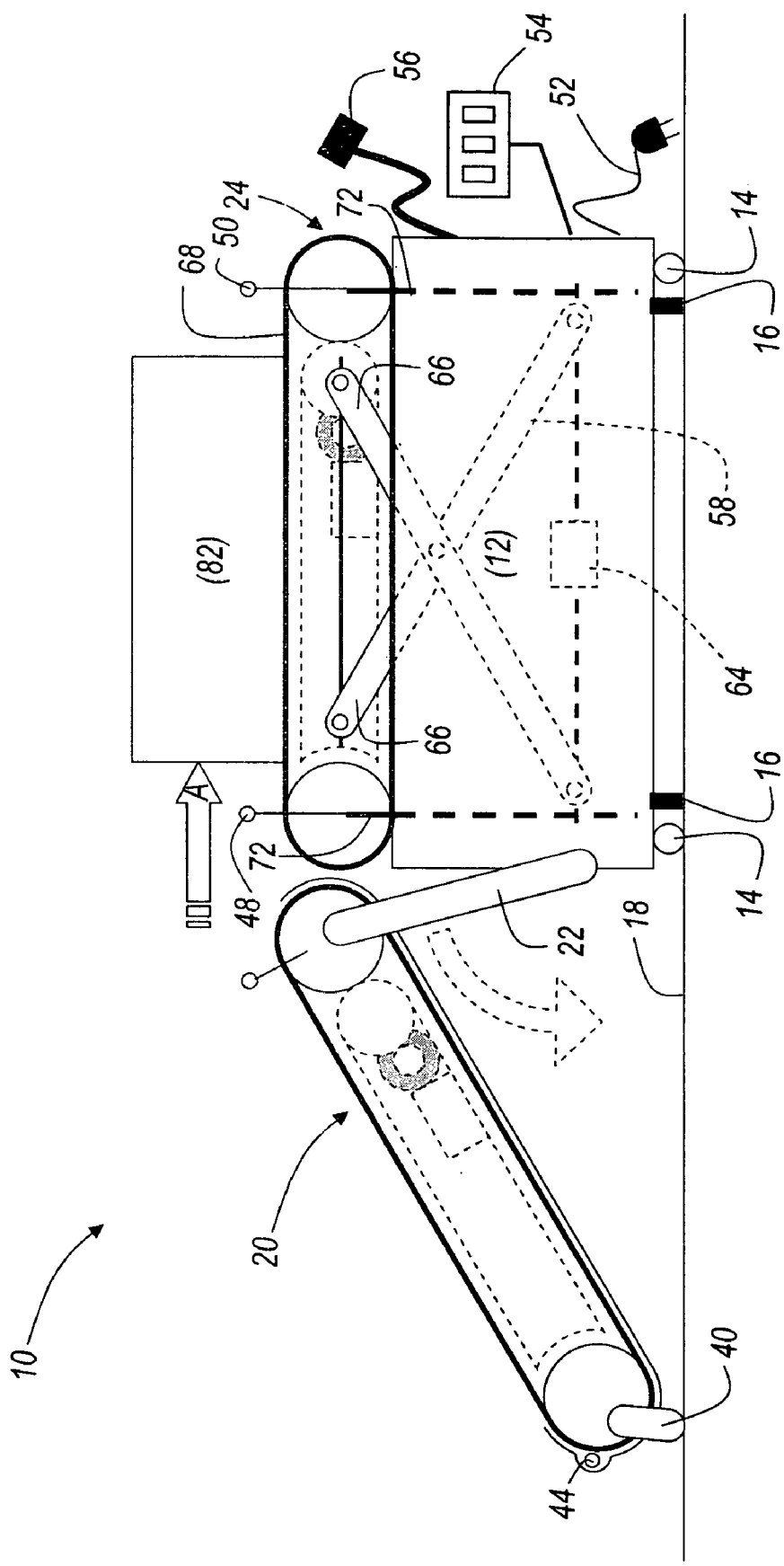

PORTABLE ARTICULATING CONVEYOR DEVICE AND METHOD OF OPERATING A PORTABLE ARTICULATING CONVEYOR

BACKGROUND OF THE INVENTION

1. Field of the Invention

The present invention generally relates to a method of operating, storing and a portable articulating conveyor device including a base having means for releasably affixing the base to a support surface and means for moving the base with respect to the support surface, a first conveyor rotatably attached at a first end to the base by an articulating member, and a second conveyor moveably attached to the base by a vertical conveyor elevation device. The first conveyor is configured to move by the articulating member between a first horizontal position supported on the support surface and a second inclined position and is configured to transport items onto the second conveyor. The second conveyor in a first operating position is configured to receive items from the first conveyor and convey items in both a horizontal direction and a vertical direction.

2. Description of the Related Art

Conveyors are typically designed to move items placed thereon without any need of a user's intervention. Such conventional conveyors are found in most material handling systems and are specifically designed to handle goods delivered to the conveyor in a predictable and repeatable manner. Typically, most conveyors typically operate in a fixed location and are not designed to be moved in a compact manner, or moved at all.

This problem of portability restricts most conveyors to fixed locations and prevents conveyors to be used in material handling operations where a high degree of reconfiguration is required. Additionally, most conveyors are not adapted to receive items at varying heights from a plurality of users. These deficiencies are most evident in passenger baggage handling systems in the transportation field where passengers deposit hand carried luggage on conveyor systems for carriers to prepare to transport or for security screening purposes. Each passenger has luggage of varying weights and sizes just as each passenger has various physical abilities capable of lifting their luggage for deposit on a baggage handling system. Thus, typical material conveyors cannot accommodate users with limited physical ability trying to place heavy items at or beyond their physical strength into a conveyor system.

Thus, such a conventional conveyor system requires that transportation employees or security officials assist those users with limited physical ability trying to place heavy items at or beyond their physical strength into a conveyor system. This temporary reallocation of personnel places a burden on the efficiency of systems that the material handling system itself is designed to assist, and thereby causes increased work-related injuries on the assisting reallocated personnel and a slowdown in the throughput of items to be checked and passengers to be screened.

Applicant's invention addresses these problems by providing a novel conveyor that provides increased ease of access for users to place items into a material handling system, and versatility of the conveyor to be portable and easily reconfigured for integration with multiple conveyance systems or operating modes.

SUMMARY OF THE INVENTION

In view of the foregoing and other exemplary problems, drawbacks, and disadvantages of the conventional methods and structures, a purpose of the exemplary aspects of the present invention is to provide portable conveyor and method of use therefore to increase ease of access for users when placing items into a material handling system, and versatility of the conveyor to be portable and easily reconfigured for integration with multiple conveyance systems or operating modes.

An exemplary aspect of the present invention includes, a portable conveyor including a base having means for releasably affixing the base to a support surface and means for moving the base with respect to the support surface, a first conveyor rotatably attached at a first end to the base by an articulating member, and a second conveyor moveably attached to the base by a vertical conveyor elevation device, wherein the first conveyor being configured to move by the articulating member between a first horizontal position supported on the support surface and a second inclined position and being configured to transport items onto the second conveyor, wherein the second conveyor in a first operating position being configured to receive items from the first conveyor and convey items in both a horizontal direction and a vertical direction.

In another exemplary aspect of the present invention, wherein the articulating member is rotatably attached to the base.

In another exemplary aspect of the present invention, wherein the vertical conveyor elevation device elevates the second conveyor in a vertical direction.

In another exemplary aspect of the present invention, wherein the vertical conveyor elevation device is controlled to elevate the second conveyor from the first operating position to one of a plurality of second maximum height operating positions.

In another exemplary aspect of the present invention, wherein the vertical conveyor elevation device lowers the second conveyor to a storage position below the first operating position.

In another exemplary aspect of the present invention, wherein the articulating member rotates the first conveyor to a storage position that overlays the first conveyor on a top portion of the second conveyor.

In another exemplary aspect of the present invention, wherein the vertical conveyor elevation device lowers the second conveyor to a storage position below the first operating position.

In another exemplary aspect of the present invention, wherein the vertical conveyor elevation device positions the second conveyor in the first operating position configured to convey an item in an inclined direction.

In another exemplary aspect of the present invention, further including control means for responding to control signals from an external device that operate the first and second conveyors, the articulating member and the vertical conveyor elevation device.

In another exemplary aspect of the present invention, further including at least one conveyance item detecting sensor on at least one of the first and the second conveyors that generates a detecting signal when a conveyance item is located on a certain portion of one of the first and second conveyors, the detecting signal is used to control the operation of at least one of the first and second conveyors, the articulating member and the vertical conveyor elevation device and a UV germicidal irradiation (UVGI) source positioned between a belt of at least one of the first and second conveyors and a protective shield configured to sanitize the belt from micro-organisms.

An exemplary method according to the exemplary aspects of the present invention may include a method of operating a portable conveyor, the portable conveyor including a moveable base, a first conveyor rotatably attached to the base by an articulating member, and a second conveyor movably attached to an upper portion of the base by a vertical conveyor elevation device, the method including moving the first conveyor by the articulating member into a first horizontal position supported on the support surface, the first conveyor being able to convey items in a horizontal direction, moving the first conveyor by the articulating member into a second inclined position having a second end of the first conveyor supported on the support surface, the first conveyor being able to convey in an inclined direction to the second conveyor at a first operating position, elevating the second conveyor in a vertical direction to a second operating position.

In another method according to the exemplary aspects of the present invention may include, wherein both of the moving the first conveyor by the articulating member further includes rotating the articulating member relative to the base.

In another method according to the exemplary aspects of the present invention may include, further including controlling the portable conveyor to convey items on the second conveyor in both a horizontal and a vertical direction.

In another method according to the exemplary aspects of the present invention may include, further including lowering the second conveyor from the first operating position by the vertical conveyor elevation device to a lowered storage position.

In another method according to the exemplary aspects of the present invention may include, further including rotating the first conveyor via the articulating member to overlay a top portion of the second conveyor in the lowered storage position.

In another method according to the exemplary aspects of the present invention may include, wherein the second operating position of the second conveyor is configured to be above the first operating position.

In another method according to the exemplary aspects of the present invention may include, wherein the elevating the second conveyor further includes controlling the second conveyor to elevate from the first operating position to one of a plurality of second maximum height operating positions.

In another method according to the exemplary aspects of the present invention may include, further including controlling the first and second conveyors, the articulating member and the vertical conveyor elevation device by signals transmitted from an external device.

In another method according to the exemplary aspects of the present invention may include, further including sensing one of a presence and an absence of an item on one of the first and second conveyors, and generating a control signal to control the operation of one of the first and second conveyors, the articulating member and the vertical conveyer elevation device based on the sensing one of a presence and an absence of an item on one of the first and second conveyors.

In still another method according to the exemplary aspects of the present invention may include, a method of operating a portable conveyor, the portable conveyor including a moveable base, a first conveyor rotatably attached to the base by an articulating member, and a second conveyor movably attached to an upper portion of the base by a vertical conveyor elevation device, the method including lowering the second conveyor from a lowest operating position to a lowered storage position by the vertical conveyor elevation device, and rotating the first conveyor about a first end by the articulating member, and rotating the articulating member about the base such that the first conveyor overlays a top portion of the second conveyor in the lowered storage position.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 1 illustrates a schematic side view of a first exemplary embodiment of the invention wherein a first conveyor lies substantially on a support surface;

FIG. 2 illustrates a schematic side view of the first exemplary embodiment of the invention further illustrating an inclined disposition of a first conveyor;

FIG. 3 illustrates a schematic side view of the first exemplary embodiment of the invention further illustrating a vertical conveyor elevating mechanism of a second conveyor;

FIG. 5 illustrates a schematic side view of the first exemplary embodiment of the invention further illustrating the vertical conveyor elevating mechanism of the second conveyor in a retracted state;

FIG. 7A illustrates a schematic side view of the first exemplary embodiment of the invention of an item being conveyed on a first end of the first conveyor in a horizontal position;

FIG. 7B illustrates a schematic side view of the first exemplary embodiment of the invention of an item being conveyed toward a second opposite end of the first conveyor while the first conveyor is rotated to an upwardly inclined position;

FIG. 7C illustrates a schematic side view of the first exemplary embodiment of the invention of an item being conveyed on a second opposite end of the first conveyor in an upwardly inclined direction;

FIG. 7E illustrates a schematic side view of the first exemplary embodiment of the invention of an item being transferred to a center portion of the second conveyor;

DETAILED DESCRIPTION OF EXEMPLARY EMBODIMENTS OF THE INVENTION

Figure 4A:
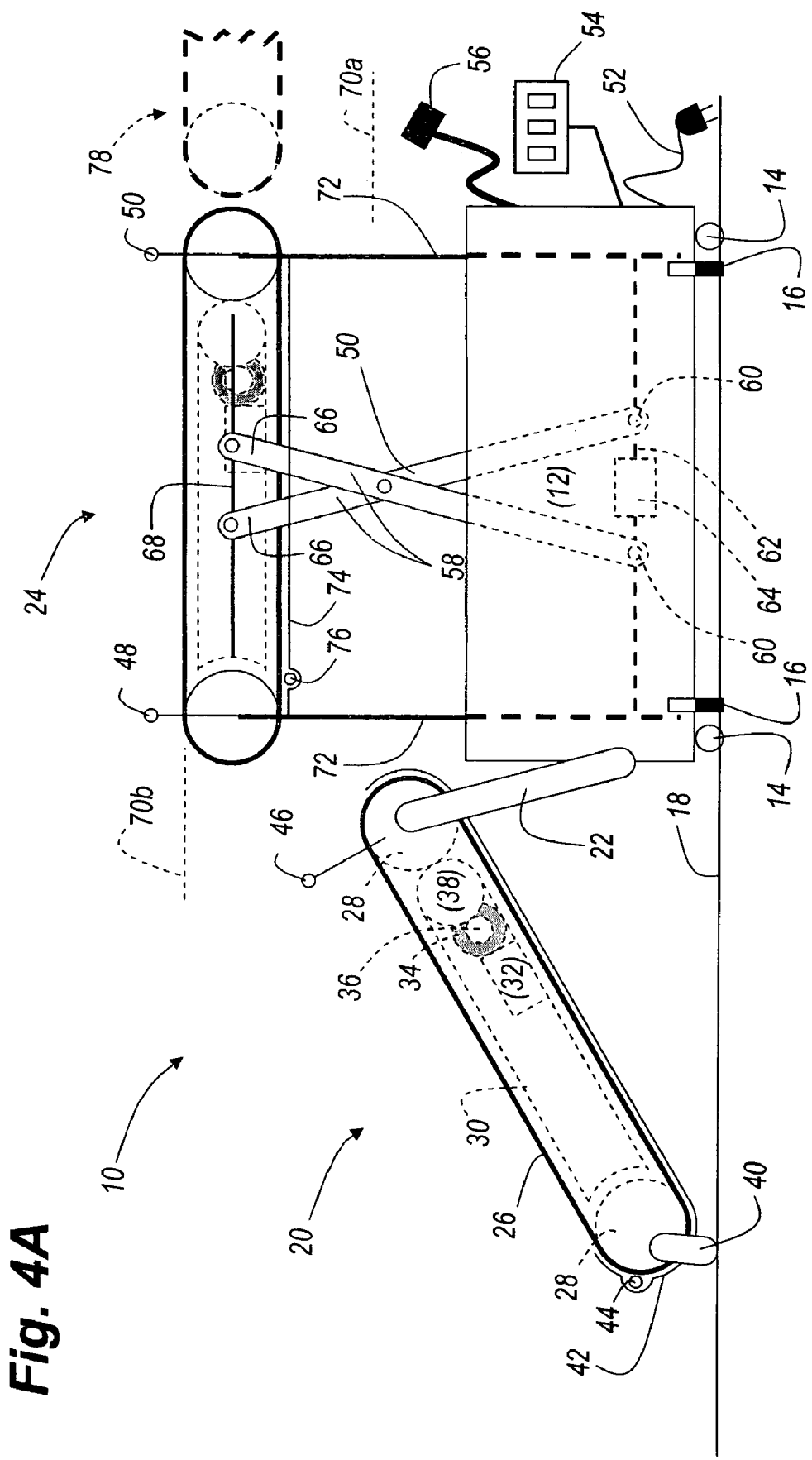
FIG. 4A illustrates a schematic side view of the first exemplary embodiment of the invention further illustrating the vertical conveyor elevating mechanism of the second conveyor in an extended state.

Referring now to the drawings, and more particularly to FIGS. 1-6 and 7A-7H, there are shown two exemplary embodiments of the method and structures of the present invention.

FIG. 1 illustrates a portable conveyor 10 that includes a base member 12 having a plurality of wheels 14 that enable moving the portable conveyor 10 and at least one stopper 16 or releasable brake that engages the support surface 18 prevent movement of the portable conveyor 10 relative to the support surface 18 during operation. Stoppers 16 are configured in a manner to be stowed within the base 12 during transportation of the portable conveyor and to project downwardly from the base 12 engaging the support surface 18 portable conveyor 10 when in operation. An alternative embodiment may include releasable locks incorporated into the wheels 14 themselves to prevent movement of the portable conveyor 10 during operation.

A first powered conveyor 20 located to one side of the base 12 being rotatably attached to the base 12 by an articulating member 22 and mounted to peripheral edges of the first conveyor 20. The articulating member 22 is rotatably attached to both the first conveyor 20 and the base 12. A second powered conveyor 24 is supported on a top portion of the base 12, and is positioned above the operating position of first conveyor 20.

The functional conveyor components of each of the first and second conveyors, 20 and 24, respectively, are similar and comprise a rotating belt 26 where items for conveyance are placed upon, belt cylinders 28 on both ends of the conveyor that support the belt 26, conveyor belt supporting surfaces 30 underlying the belt 26 that physically support items placed on the belt, a control module or control circuitry 32 that controls the operation of an electric motor 34 having a motor output gear 36 that drives a transfer gear 38 engaged with one of the rotating belt cylinders 28.

The first conveyor 20 additionally includes a support foot 40 at a distal end of the first conveyor 20 wherein the foot 40 includes a roller element that engages the support surface 18. The articulating member 22 rotates about its connection on base 12 and positions the first conveyor 20 such that the belt 26 is substantially parallel to the support surface 18 which allows the greatest ease in a user placing an item on the first conveyor 20 with respect to support surface 18. This configuration of the invention requires a user to only lift an item just over the actual height of the first conveyor 20 when it is substantially parallel to the support surface 18.

The first conveyor 20 additionally includes a belt shield 42 or outer casing that separates the belt 26 from contacting the support surface 18 and protects the user and items from being pinched between either end of the first conveyor 20 and the support surface 18.

Figure 4B:
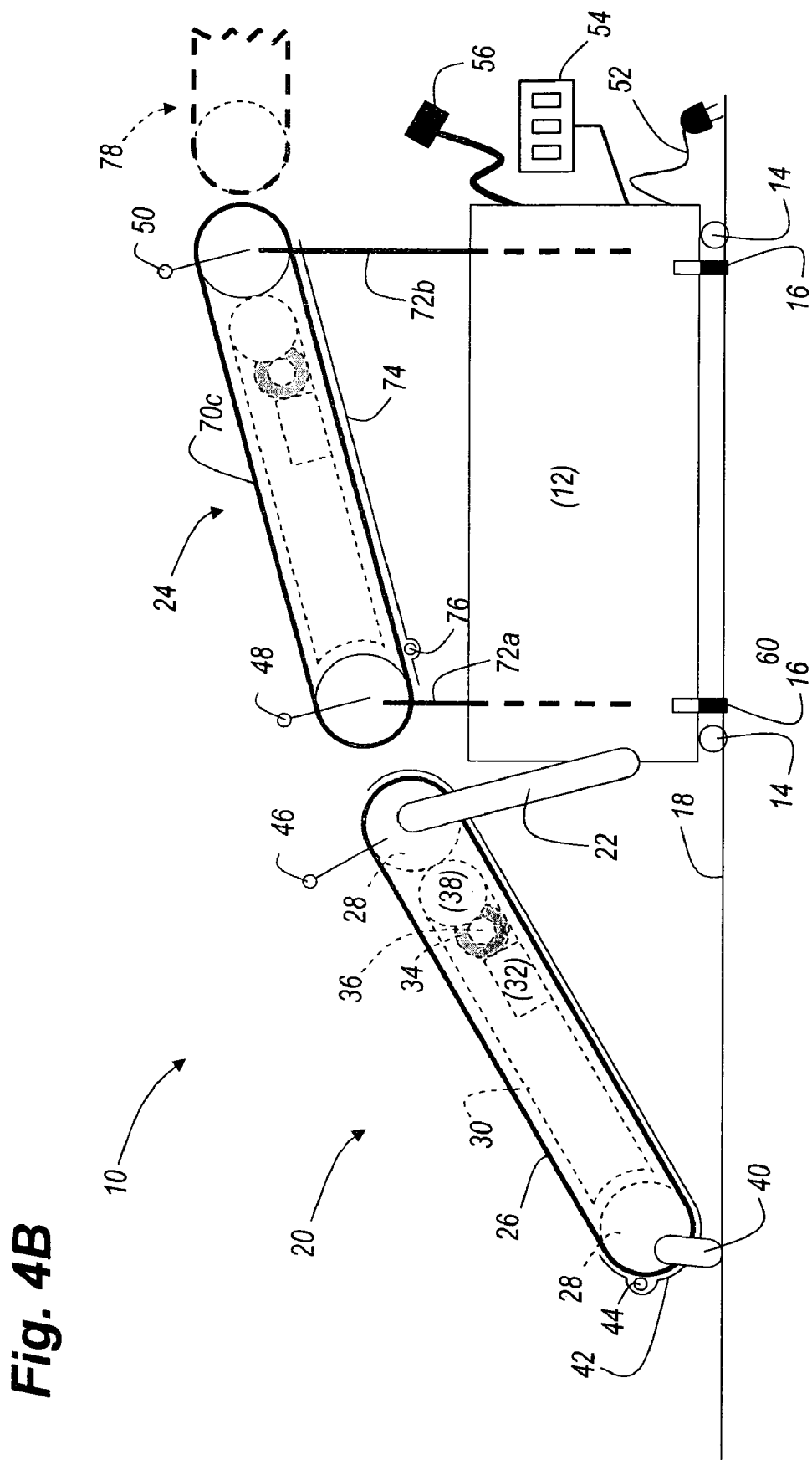
FIG. 4B illustrates a schematic side view of a second exemplary embodiment of the invention further illustrating a second embodiment of a vertical conveyor elevating mechanism of the second conveyor in an extended inclined state.

A high intensity UV germicidal irradiation (UVGI) source 44, such as Mercury vapor lamp emitting at 254 nm wavelength, is positioned between the belt shield 42 and the belt 26 and is configured to sanitize the entire width of the belt 26 from micro-organisms as it rotates during operation. FIGS. 4A-4B similarly illustrate a belt shield 74 and a UVGI source 76 positioned on the second conveyor 24. Alternatively, UVGI source 44 or 76 may be configured to expose the entire underside of the belt 26 enclosed by the belt shield 42 or 74, (not shown), to enable sufficient exposure time to sanitize certain micro-organisms needing longer duration in UV light to be sanitized. This UVGI lamp 44 emits UV radiation on the entire belt 26 each time the belt 26 completes a single rotation about the belt cylinders 28, or for the time duration when the belt 26 is enclosed in the belt shield 42. This feature is extremely beneficial for keeping the belt 26 free from infectious micro-organisms transferred to the belt 26 from items placed on it by users.

Additionally, a first conveyor item position sensor 46 is located near an end of the first conveyor 20 closest to the base 12 and functions to determine whether an item is positioned on the first conveyor at the location of the sensor 46. This sensor may be a proximity sensor measuring fluctuations of inductance fields, (that may be measured through the conveyor belt 26), a light beam emitter and beam receiver, a weight sensor, or any other type of sensor that functions to determine the presence and absence of an item at a particular location on conveyor belt. The second conveyor 24 additionally includes item position sensors 48 and 50, similar in nature and function to sensor 46, on opposite ends of an upper surface of the second conveyor 24.

These item position sensors 46, 48 and 50 detect the position of an item on each of the first and second conveyors 20 and 24, respectively, and transmit sensor signals to a system controller, (not shown), located either in the portable conveyor 10 or in a remote controller that controls the operation of the portable conveyor, including both the first and second conveyors, 20 and 24, respectively.

The portable conveyor 10 additionally includes a removable electrical power supply connection 52, a user control input interface 54 for manual control of the portable conveyor 10 by an operator, and a control signal interface 56 for connecting the portable conveyor 10 to a remote device or system that may control the portable conveyor 10 from a remote location or an auxiliary system that receives conveyed items from the portable conveyor 10. Control signal interface 56 allows for controlling the synchronous operation of each of the components of the portable conveyor 10 such that it may be incorporated into a larger conveyance system or be controlled by another auxiliary device.

FIG. 2 illustrates the invention of FIG. 1 where the articulating member 22 rotates in an upward direction about its connection with base 12 to lift the attached end of the first conveyor 20 into an inclined position that allows for conveyance items to be transported to the operating position of the second conveyor 24. While the articulating member 22 rotates the first conveyor 20 into an upward inclined position, the support foot 40 including a roller member, (not shown), rolls along the support surface 18 to support the opposite end of the first conveyor 20.

FIG. 3 illustrates the invention as shown in FIGS. 1 and 2 wherein the second conveyor 24 includes a second conveyor elevating mechanism 58 mounted on the peripheral edges of the second conveyor 24. A first embodiment of the elevating mechanism 58 includes two support bars joined at a central rotating connection yielding an "X" type cross configuration, although the elevating mechanism 58 may be, for example, a hydraulic piston, or solenoid, or any other means capable of raising and lowering the second conveyor 24.

Powered actuating ends 60 of the elevating mechanism 58 are pivotally connected to a laterally disposed actuated elevator rod 62 having a centrally disposed elevating actuator 64. The elevating actuator 64 may include a motor that drives the actuated elevator rod 62 configured, for example, as a worn gear that moves each of the powered actuating ends 60 in a lateral direction. Alternatively, the elevating actuator 64 may include hydraulic actuator or solenoid that connects to each of the powered actuating ends 60 to move them in a lateral direction along the direction of the actuated elevator rod 62.

On the opposite ends of the elevating mechanism 58, conveyor actuating ends 66 are attached to the peripheral edges of the second conveyor 24 at a lateral conveyor elevator rod or slot 68. As the elevator actuator 64 retracts the powered actuating ends 60 together in the direction of the actuated elevator rod 62, the conveyor actuating ends 66 slide toward each other along conveyor elevator rod or slot 68, thus raising the second conveyor 24 as illustrated in FIG. 4A.

Reference number 70a designates the lowest operating position of the second conveyor 24 for receiving items from the first conveyor 20. The second conveyor 24 may be further stabilized by vertical stabilizers 72 positioned on the peripheral edges of the second conveyor 24. These vertical stabilizers 72 prevent movement in a lateral direction when the second conveyor 24 is moved from the lowest operating position 70a toward a maximum operating position 70b of the second conveyor 24.

FIG. 4A illustrates when the second conveyor elevating mechanism 58 raises the second conveyor 24 in a vertical direction above the lowest operating position 70a of the second conveyor 24 to a second or maximum operating position 70b. The maximum operating position 70b of the second conveyor 24 enables an item received from the first conveyor 20 to be transferred to a third conveyor 78 at a given height.

FIG. 4B illustrates a second embodiment of the invention where the second conveyor elevating mechanism 58 of FIG. 4A is replaced with a receiving end powered vertical lifting device 72a and a delivering end powered vertical lifting device 72b attached to peripheral ends of the second conveyor 24. Both lifting devices may include hydraulically actuated cylinders or solenoids, or any other linearly extending mechanism capable of supporting the weight of the second conveyor 24 and any conveyance items. In this embodiment, the delivering end powered vertical lifting device is raised to the maximum operating position 70c such that items may be conveyed to an auxiliary system or conveyance device 78 at a proper receiving height. Thereafter, the second conveyor 24 operates to convey items in the fixed inclined position denoted by reference number 70c.

A portable conveyor controller, (not shown), controls the maximum operating positions of both embodiments, (70b in the first embodiment of FIG. 4A, or 70c in the second embodiment of FIG. 4B being the height of the delivery end of the second conveyor 24), so that the portable conveyor 10 may adjusted to be used in variety of configurations with auxiliary devices or secondary conveyance systems having different item receiving heights. Once the maximum operating position is set for a particular delivery height, the second conveyor 24 may either cycles between that maximum position 70b and the lowest first operating position 70a in the first embodiment in FIG. 4A, or may be set at the maximum position 70c of the second embodiment in FIG. 4B.

FIG. 5 illustrates the first embodiment of FIG. 4B where the second conveyor elevating mechanism 58 lowers the second conveyor 24 from its maximum operating position at 70b in a downward direction below the lowest operating position 70a to a retracted storing position 80. The second conveyor 24 may be lowered to a position that is fully contained within the base 12 as illustrated in FIG. 5, allowing for the compact storage of the first conveyor 24 to be positioned thereupon the second conveyor 24, see FIG. 6, below. Additionally, the powered lifting device 72a and 72b of FIG. 4B may lower, (not shown), the second conveyor 24 from its maximum operating position 70c to the retracted storage position 80.

Figure 6:
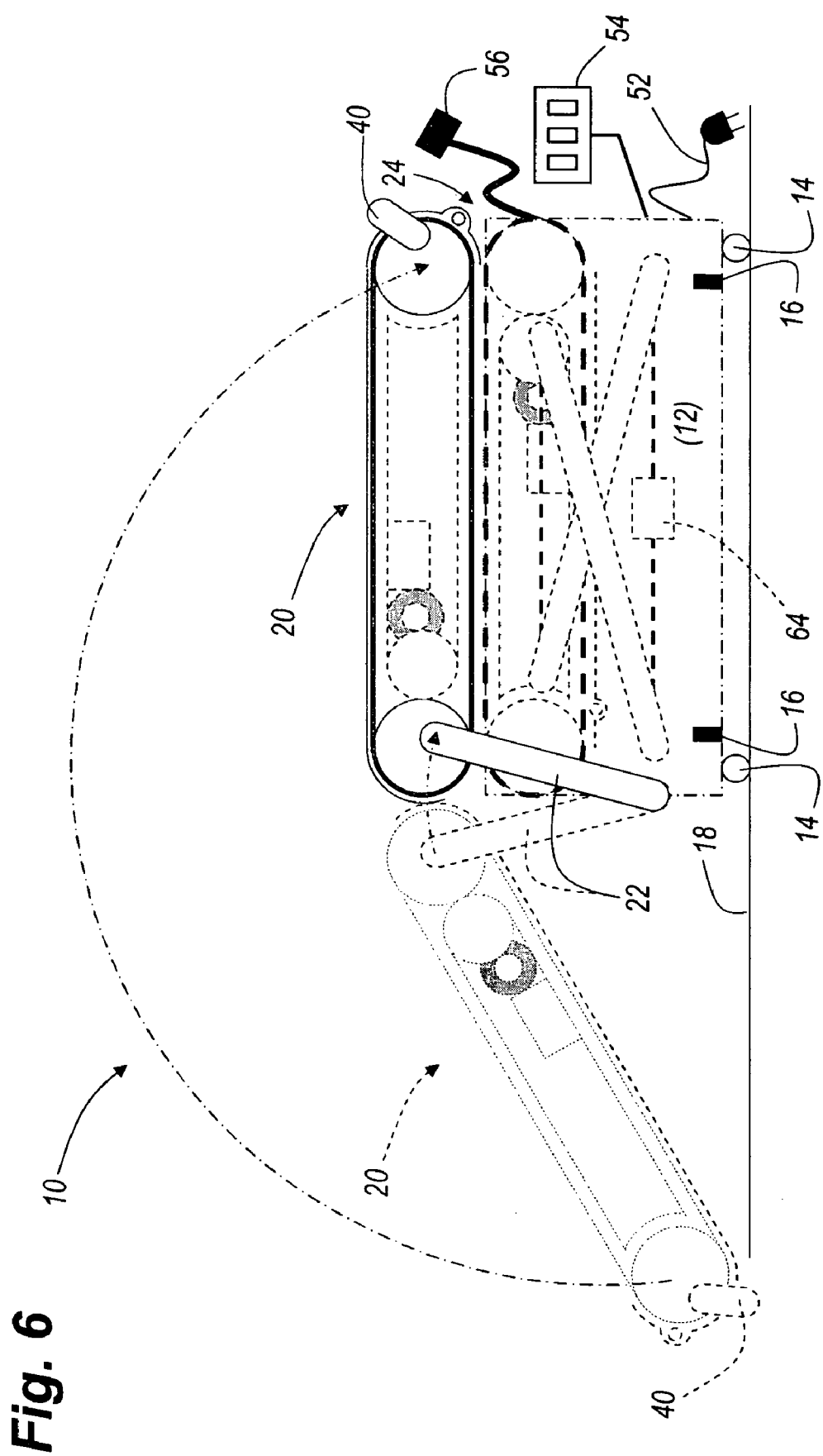
FIG. 6 illustrates a schematic side view of the first exemplary embodiment of the invention further illustrating the first conveyor rotated and laying on the second conveyor in a retracted state.

FIG. 6 illustrates a storage configuration where the portable conveyor 10 is prepared and positioned for transport in a compact form. Generally, the first conveyor 20 is rotated by means of articulating member 22 up and over the base 12 to and on top of the second conveyor 24 in its retracted position 80. The first conveyor 20 rotates about the articulating member 22 to be flipped substantially upside-down, and the articulating member 22 rotates about and angle on the base 12 where the first conveyor is positioned substantially on top of the upper surface of the second conveyor 24. In this configuration, stoppers 16 are retracted into the bottom of the base 12 and the wheels 14 are enabled to move the portable conveyor 10 in a compact configuration from one location to another.

FIGS. 7A-7H illustrate a method of moving a conveyance item 82 from a position proximate the support surface 18 to an auxiliary conveyor or receiving system at a position above the lowest operating position 70a, 70c of the second conveyor 24.

FIG. 7A illustrates a conveyance item 82 placed on the first conveyor 20 that is positioned substantially parallel to the support surface 18. Again, this allows minimal effort of a user to lift the item 82 to the height just above the first conveyor 20 to place the item on the belt 26. Thereafter, the first conveyor 20 conveys the item 82 in a direction A having a horizontal component.

FIG. 7B illustrates that when the conveyance item 82 is sensed by the first conveyor item position sensor 46, the articulating member 22 rotates about its attachment to the base 12 and lifts the first conveyor in an upwardly inclined direction and continues to convey item 82 in an inclined direction A toward a received end of the second conveyor 24.

FIG. 7C illustrates conveyance item 82 approaching the upper end of the first conveyor 20 while moving in the direction denoted by arrow A toward the first end of the second conveyor 24.

Figure 7D:
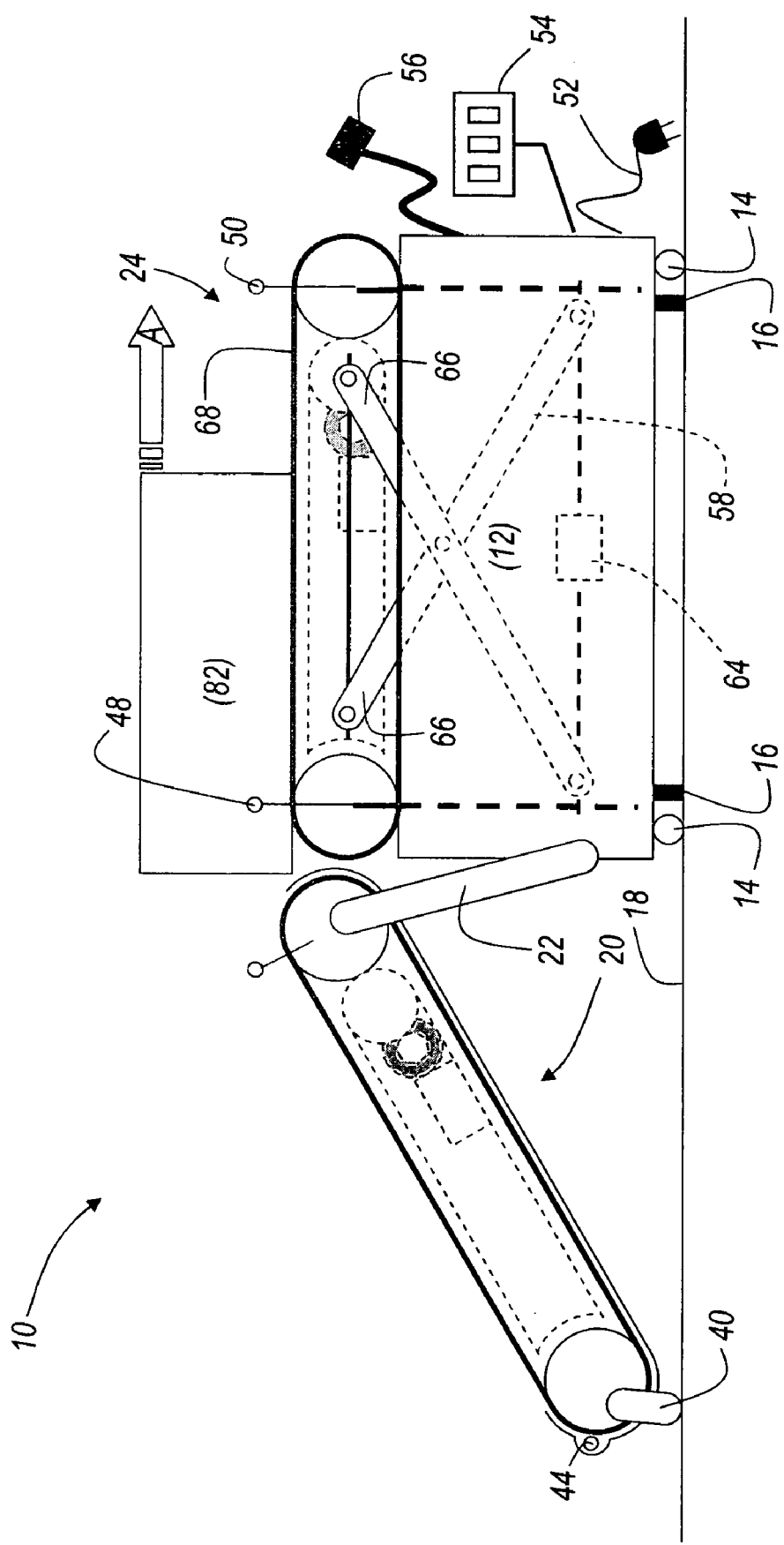
FIG. 7D illustrates a schematic side view of the first exemplary embodiment of the invention of an item being transferred to a first end of the second conveyor.

FIG. 7D illustrates the conveyance item 82 engaging a first end of the second conveyor 24 and being sensed by the receiving end sensor 48 of the second conveyor 24. Once the receiving end sensor 48 of the second conveyor 24 determines that conveyance item 82 has been delivered to the first end of second conveyor 24, the sensor 48 sends a signal to a local central control unit, (not shown), to activate the second conveyor 24 in the horizontal direction A.

FIG. 7E illustrates the conveyance item 82 being conveyed in a horizontal direction A across the top surface belt of second conveyor 24. When the receiving end item position sensor 48 of the second conveyor 24 determines that the conveyance item 82 has cleared the sensor 48, a control signal is sent to a central control unit that activates the articulating member 22 to rotate the first conveyor 20 back into a position being substantially parallel with the support surface 18, and the second conveyor 24 may begin a vertical elevation process to be raised to its predetermined maximum operation position to deliver the item 82 to an auxiliary conveyor or system 78.

Figure 7F:
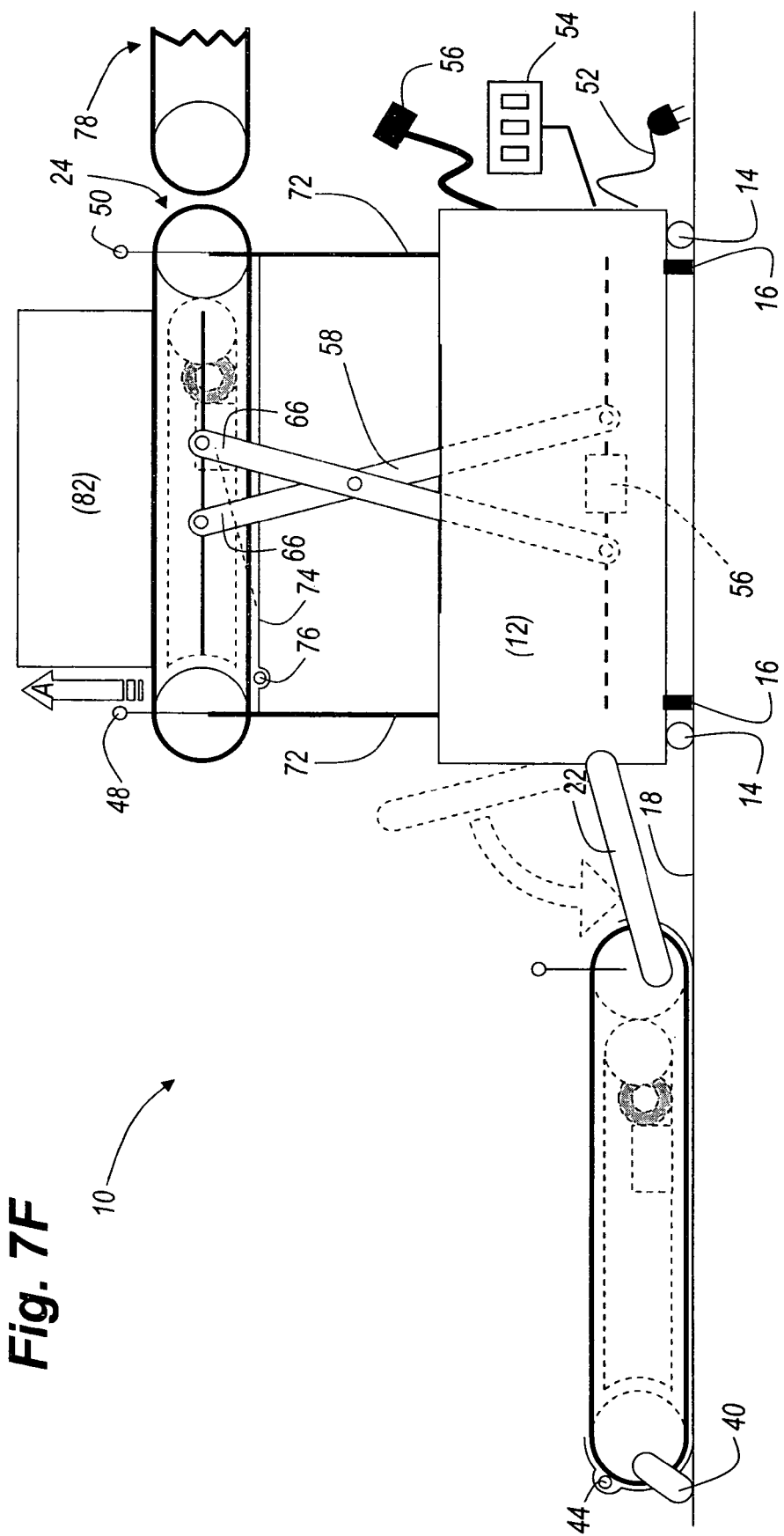
FIG. 7F illustrates a schematic side view of the first exemplary embodiment of the invention of an item being lifted on the second conveyor in a vertical direction from a first operating position, as illustrated in FIG. 7E, to a second elevated operating position on the second conveyor.

FIG. 7F illustrates the second conveyor 24 and the conveyance item 82 being lifted in an upward vertical direction A by the second conveyor elevating mechanism 58 being activated by the elevator actuator 64, as previously described. Vertical stabilizer bars 72 maintain the horizontal stability of the second conveyor 24 as it is lifted by the second conveyor elevating mechanism 58 toward its maximum operating position. Additionally, the first conveyor 20 is rotated back into a position substantially parallel with the support surface 18 by the rotation of the articulating member 22 about the base 12.

Figure 7G:
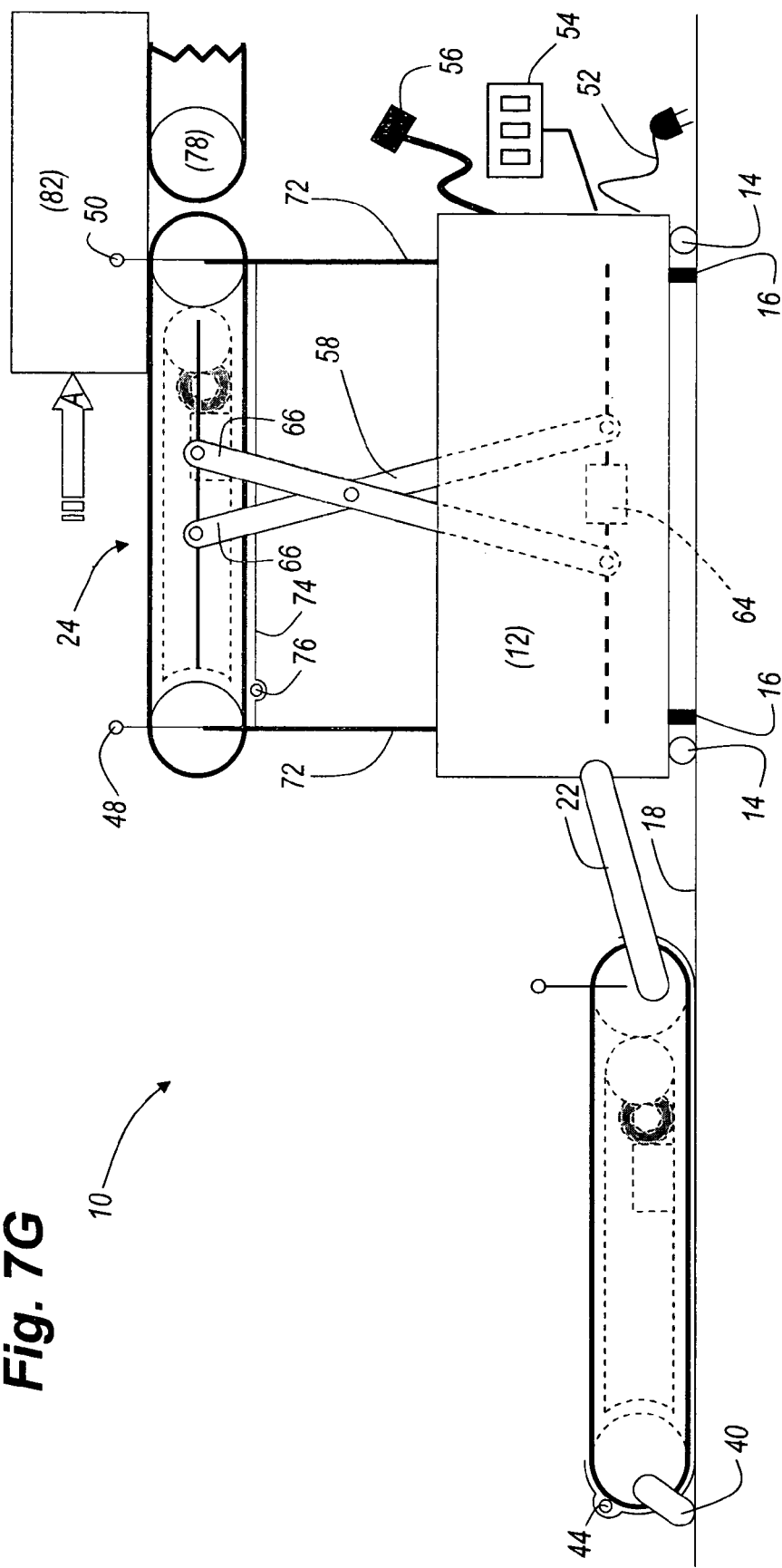
FIG. 7G illustrates a schematic side view of the first exemplary embodiment of the invention of an item being transferred from the second conveyor to a first end of a third conveyor.

FIG. 7G illustrates the conveyance item 82 being conveyed in a direction A toward the delivery end of the second conveyor 24 and onto a third conveyor 78. As longs as delivery end item position sensor 50 of the second conveyor 24 senses the presence of the conveyance item 82, the second conveyor 24 continues rotating the conveyor belt in the direction A.

Figure 7H:
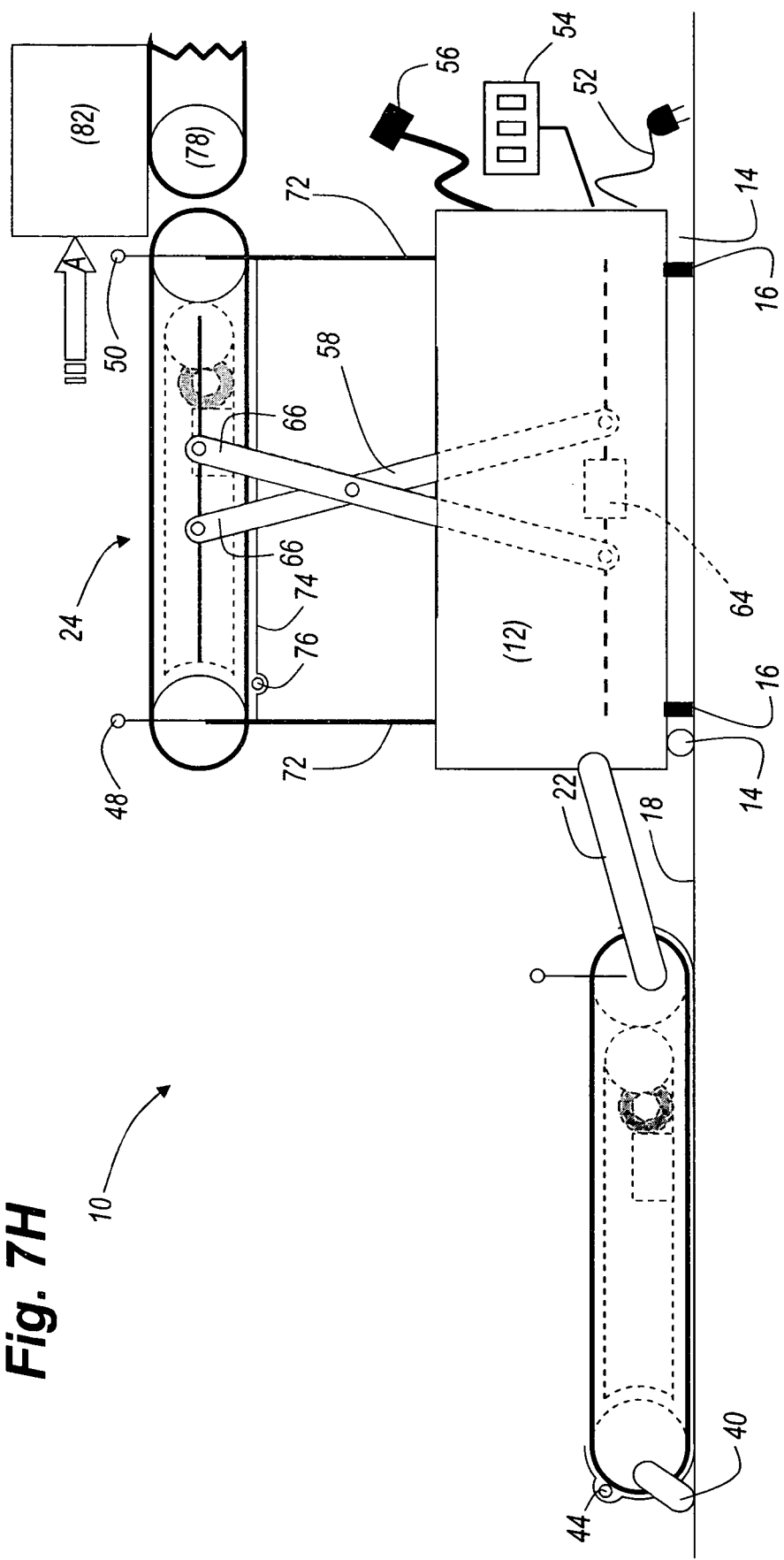
FIG. 7H illustrates a schematic side view of the first exemplary embodiment of the invention of an item being fully transferred off the second conveyor onto a third conveyor.

FIG. 7H illustrates the conveyance item 82 being fully transferred to the third conveyor 78 from the second conveyor 24. When the delivery end item position sensor 50 senses the absence of the conveyance item 82 on the second conveyor 24, and the second conveyor 24 stops rotating the conveyor belt and prepares to lower of the second conveyor 24 via the second conveyor elevating mechanism 58 back to into the lowest operating position 70a of the second conveyor 24, see FIGS. 3, and 7A-7E.

With its unique and novel features, the present invention provides a portable conveyor and method of use therefore to increase ease of access for users when placing items into a material handling system, and versatility of the conveyor to be portable and easily reconfigured for integration with multiple conveyance systems or operating modes.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A portable conveyor device comprising:
    a base having means for releasably affixing said base to a support surface and means for moving said base with respect to said support surface;
    a first conveyor rotatably attached at a first end to said base by an articulating member;
    a second conveyor moveably attached to said base by a vertical conveyor elevation device, and
    at least one conveyance item detecting sensor on at least one of said first and said second conveyors that generates a detecting signal when a conveyance item is located on a certain portion of one of said first and second conveyors, said detecting signal is used to control the operation of at least one of said first and second conveyors, said articulating member and said vertical conveyor elevation device,
    wherein said first conveyor being configured to move by said articulating member between a first horizontal position supported on said support surface and a second inclined position and being configured to transport items onto said second conveyor,
    wherein said second conveyor in a first operating position being configured to receive items from said first conveyor and convey items in both a horizontal direction and a vertical direction.

2. The portable conveyor according to claim 1, wherein said articulating member is rotatably attached to said base.

3. The portable conveyor according to claim 1, wherein said vertical conveyor elevation device elevates said second conveyor in a vertical direction.

4. The portable conveyor according to claim 3, wherein said vertical conveyor elevation device is controlled to elevate said second conveyor from said first operating position to one of a plurality of second maximum height operating positions.

5. The portable conveyor according to claim 1, wherein said articulating member rotates said first conveyor to a storage position that overlays the first conveyor on a top portion of said second conveyor.

6. The portable conveyor according to claim 5, wherein said vertical conveyor elevation device lowers said second conveyor to a storage position below said first operating position.

7. The portable conveyor according to claim 1, wherein said vertical conveyor elevation device positions said second conveyor in said first operating position configured to convey an item in an inclined direction.

8. The portable conveyor according to claim 1, further comprising:
    control means for responding to control signals from an external control device that controls the synchronous operation of said first and second conveyors, said articulating member and said vertical conveyor elevation device.

9. The portable conveyor according to claim 1, further comprising:
    a UV germicidal irradiation (UVGI) source positioned between a belt of at least one of said first and second conveyors and a protective shield configured to sanitize said belt from micro-organisms.

10. A method of operating a portable conveyor, said portable conveyor including a moveable base, a first conveyor rotatably attached to said base by an articulating member, and a second conveyor movably attached to an upper portion of said base by a vertical conveyor elevation device, said method comprising:
    moving said first conveyor by said articulating member into a first horizontal position supported on said support surface, said first conveyor being able to convey items in a horizontal direction;
    moving said first conveyor by said articulating member into a second inclined position having a second end of said first conveyor supported on said support surface, said first conveyor being able to convey in an inclined direction to said second conveyor at a first operating position;
    elevating said second conveyor in a vertical direction to a second operating position;
    sensing one of a presence and an absence of an item on one of said first and second conveyors; and
    generating a control signal to control the operation of one of said first and second conveyors, said articulating member and said vertical conveyer elevation device based on said sensing one of a presence and an absence of an item on one of said first and second conveyors.

11. The method according to claim 10, wherein both of said moving said first conveyor by said articulating member further comprises:
    rotating said articulating member relative to said base.

12. The method according to claim 10, further comprising:
    controlling said portable conveyor to convey items on said second conveyor in both a horizontal and a vertical direction.

13. The method according to claim 10, wherein said second operating position of said second conveyor is configured to be above said first operating position.

14. The method according to claim 10, wherein said elevating said second conveyor further comprises:
    controlling said second conveyor to elevate from said first operating position to one of a plurality of second maximum height operating positions.

15. The method according to claim 10, further comprising:
controlling the synchronous operation of said first and second conveyors, said articulating member and said vertical conveyor elevation device by signals transmitted from an external device.

16. A method of operating a portable conveyor, said portable conveyor including a moveable base, a first conveyor rotatably attached to said base by an articulating member, and a second conveyor movably attached to an upper portion of said base by a vertical conveyor elevation device, said method comprising:
lowering said second conveyor from a lowest operating position to a lowered storage position by said vertical conveyor elevation device; and
rotating said first conveyor about a first end by said articulating member, and rotating said articulating member about said base such that said first conveyor overlays a top portion of said second conveyor in said lowered storage position.

17. A portable conveyor device comprising:
a base having means for releasably affixing said base to a support surface and means for moving said base with respect to said support surface;
a first conveyor rotatably attached at a first end to said base by an articulating member; and
a second conveyor moveably attached to said base by a vertical conveyor elevation device,
wherein said first conveyor being configured to move by said articulating member between a first horizontal position supported on said support surface and a second inclined position and being configured to transport items onto said second conveyor,
wherein said second conveyor in a first operating position being configured to receive items from said first conveyor and convey items in both a horizontal direction and a vertical direction, and
wherein said vertical conveyor elevation device lowers said second conveyor to a storage position below said first operating position.

18. A method of operating a portable conveyor, said portable conveyor including a moveable base, a first conveyor rotatably attached to said base by an articulating member, and a second conveyor movably attached to an upper portion of said base by a vertical conveyor elevation device, said method comprising:
moving said first conveyor by said articulating member into a first horizontal position supported on said support surface, said first conveyor being able to convey items in a horizontal direction;
moving said first conveyor by said articulating member into a second inclined position having a second end of said first conveyor supported on said support surface, said first conveyor being able to convey in an inclined direction to said second conveyor at a first operating position;
elevating said second conveyor in a vertical direction to a second operating position; lowering said second conveyor from said first operating position by said vertical conveyor elevation device to a lowered storage position;
lowering said second conveyor from said first operating position by said vertical conveyor elevation device to a lowered storage position; and
rotating said first conveyor via said articulating member to overlay a top portion of said second conveyor in said lowered storage position.

* * * * *